United States Patent
Huard et al.

(10) Patent No.: US 6,969,248 B1
(45) Date of Patent: Nov. 29, 2005

(54) INJECTION VALVE, ESPECIALLY FOR A MOULD FOR AN OPTICAL LENS

(75) Inventors: Marc Huard, Alfortville (FR); Benoît Bessiere, Fresne (FR); Joël Massau, Creteil (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 09/958,921

(22) PCT Filed: Apr. 11, 2000
(Under 37 CFR 1.47)

(86) PCT No.: PCT/FR00/00929

§ 371 (c)(1),
(2), (4) Date: Feb. 5, 2003

(87) PCT Pub. No.: WO00/61349

PCT Pub. Date: Oct. 19, 2000

(30) Foreign Application Priority Data

Apr. 13, 1999 (FR) .................................. 99 04579

(51) Int. Cl.[7] ............................................ B29C 45/23
(52) U.S. Cl. ...................... 425/564; 425/568; 425/808; 251/319; 251/366
(58) Field of Search ................................ 425/564, 568, 425/569, 571, 808; 251/319, 366

(56) References Cited

U.S. PATENT DOCUMENTS

| 3,985,300 | A | | 10/1976 | Pinney |
| 4,340,203 | A | | 7/1982 | Donner |
| 5,221,509 | A | | 6/1993 | Fujimoto et al. |
| 5,378,138 | A | | 1/1995 | Onuma et al. |
| 5,470,219 | A | | 11/1995 | Yokoyama et al. |
| 6,234,783 | B1 | * | 5/2001 | Shibata et al. ............... 425/549 |

FOREIGN PATENT DOCUMENTS

FR 2 624 050 6/1989

OTHER PUBLICATIONS

English abstract for FR 2 624 050.*

* cited by examiner

*Primary Examiner*—Donald Heckenberg
(74) *Attorney, Agent, or Firm*—Young & Thompson

(57) ABSTRACT

An injection valve includes an injection channel (17) that opens outwards via an outlet (18) and has a specific inlet for the arrival of the molding material (19A) remote from the outlet (18), in addition to a slider unit (20) that is moveably mounted in the injection channel (17) and controls the outlet thereof (18). The injection channel (17) has a specific outlet (19B) for discharging the molding material. The invention can be used to mold an optical lens made from a polymerizable synthetic material.

25 Claims, 3 Drawing Sheets

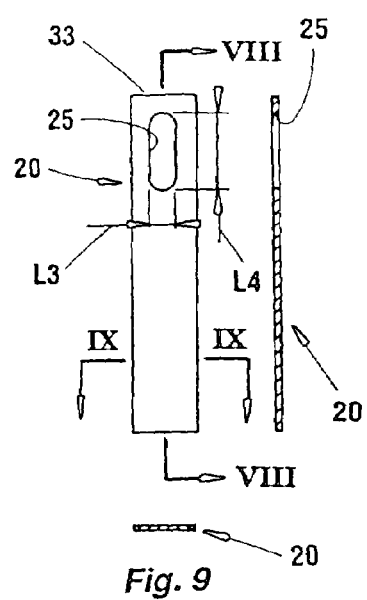
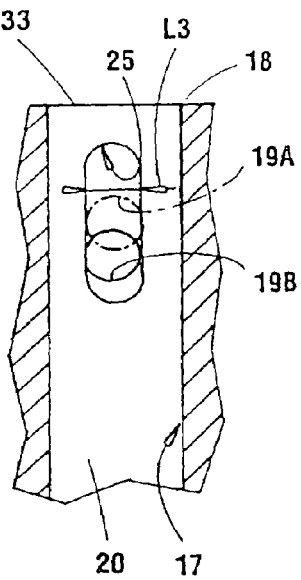
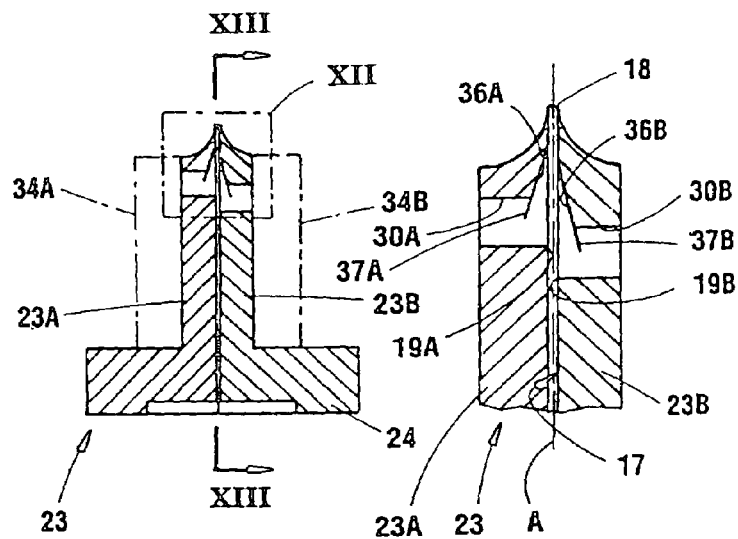

INJECTION VALVE, ESPECIALLY FOR A MOULD FOR AN OPTICAL LENS

The present invention relates generally to injection valves of the kind used to feed a mold of any kind with a molding material of any kind.

It is aimed more particularly at injection valves that have an injection channel, which opens to the outside via an outlet, and a slider unit which is mounted in the injection channel so as to be mobile in translation therein and which controls the outlet thereof. The injection channel has an inlet orifice to which the molding material is fed and which is located at a distance from the outlet.

DESCRIPTION OF THE RELATED ART

Injection valves of the above type are described in the following U.S. patents, for example: U.S. Pat. Nos. 5,221, 509, 5,378,138, 5,470,219.

The present invention is more particularly aimed at the situation in which the nature of the molding material itself causes problems.

This is the case, for example, with polymerizable synthetic materials usually employed in molding optical lenses, and in particular ophthalmic lenses, that is to say spectacle lenses.

These polymerizable synthetic materials give rise to two kinds of problem during molding.

First of all, they frequently lead to unwanted deposition of a film of material on the inside of the injection valve through which they pass, even if the latter valve has been internally treated with a material supposedly opposing any such deposition, and this leads to unwanted fouling and even clogging of the injection valve.

Also, as soon as there is a certain level of discontinuity in their path, which obviously tends to be the case when they pass through an injection valve, these polymerizable synthetic materials are frequently subject to a phenomenon known as "bubbling", i.e. bubbles tend to form spontaneously in them, which can lead to rejection of the products, for example optical lenses, molded under these conditions.

SUMMARY OF THE INVENTION

A general object of the present invention is an arrangement which is advantageous in that, somewhat unexpectedly, it minimizes or even cancels out the risk of fouling and "bubbling".

It is based on the observation, not previously disclosed, that maintaining the molding material fed to the injection valve in circulation after the mold has been properly filled minimizes these risks of fouling and "bubbling".

Thus the present invention provides an injection valve for feeding molding material to a mold, of the kind including an injection channel which opens to the outside via an outlet and which has, at a distance from said outlet, an inlet orifice to which the molding material is fed, and further including a slider unit that is mounted in the injection channel to be mobile in translation therein, and that controls the outlet thereof, characterized in that the injection channel has an outlet orifice for evacuating molding material.

Accordingly, once the mold has been filled, the molding material reaching the injection valve continues to circulate, being evacuated from the injection valve via the outlet orifice provided for this purpose.

This advantageously avoids stagnation of the molding material in the injection valve, as normally occurs when the molding material dead-ends at the closed end of the injection channel once the mold has been filled.

As a result of this, the risks of fouling of the injection valve are themselves advantageously minimized, which is what was wanted.

This advantageously further proves to apply to the risks of "bubbling" occurring in the molding material during molding thereof.

BRIEF DESCRIPTION OF THE DRAWINGS

The features and advantages of the invention will emerge further from the following description, which is given by way of example and with reference to the accompanying diagrammatic drawings, in which:

FIG. 7 is an elevation view of the slider unit of the injection valve according to the invention;

FIG. 8 is a view of the slider unit in longitudinal section taken along the line VIII—VIII in FIG. 7;

FIG. 9 is a view of the slider unit in cross section taken along the line IX—IX in FIG. 7;

FIGS. 10A and 10B are partial views in section, derived from, but to a larger scale than, FIG. 6, showing two successive phases of operation of the slider unit in the valve body;

FIG. 11 is a sectional view analogous to FIG. 3 of a different embodiment;

FIG. 12 shows the detail XII from FIG. 11 to a larger scale;

FIG. 13 is a view of the FIG. 11 embodiment analogous to that of FIG. 6 and in section taken along the line XIII—XIII in FIG. 11;

DESCRIPTION OF THE PREFERRED EMBODIMENT

Figure 1:
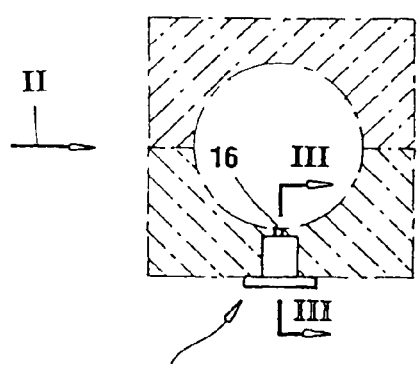
FIG. 1 is an elevation view of an injection valve in accordance with the invention, shown in position on a mold and to a relatively small scale.
Figure 2:
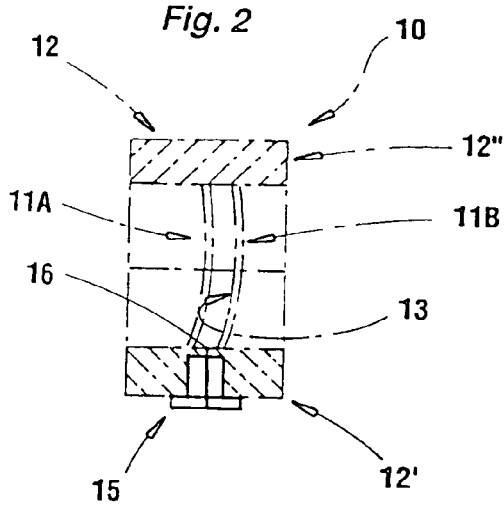
FIG. 2 is a side view of the combination, as seen in the direction of the arrow II in FIG. 1.

The figures show, by way of example, the application of the invention to molding an optical lens, to be more precise an ophthalmic lens, not shown.

The mold 10 used for such molding is formed of two molding shells 11A, 11B at whose periphery is an annular closure member 12 defining with them the necessary molding cavity 13. This is known in the art.

In the embodiment shown, the molding shells 11A, 11B are on edge and the closure member 12 is formed of two jaws 12', 12" which are carried by a common frame, not shown, and whose edges conjointly grip the molding shells 11A, 11B, having a semicircular inside contour for this purpose; at least one of the jaws, for example the top jaw 12", is mobile relative to the other jaw, here the bottom jaw 12', to enable the molding shells 11A, 11B to be inserted between them.

These arrangements are well known in the art, for example from French patent application No. 94/14926, filed Dec. 12, 1994, publication No. 2 727 894; being in themselves irrelevant to the present invention, they are not described in further detail here.

An injection valve 15 feeds the mold 10, to be more precise its molding cavity 13, with molding material. This is also known in the art.

As described in the previously cited French patent No. 94/14926, for example, the injection valve 15 is at the bottom of the molding cavity 13, to be more precise at the lowest point thereof.

To this end, the bottom jaw 12' of the closure member 12 has a localized casting opening 16 to which the injection valve 15 is applied.

The injection valve 15 has an internal injection channel 17 which opens to the outside via an outlet 18 at one end, in corresponding relationship with the casting opening 16 of the mold 10, and which has, as described in more detail later, an inlet orifice 19A at a distance from the outlet 18, and to which the molding material is fed, and a slider unit 20 that is mounted in the injection channel 17 so that it is mobile in translation therein, and which controls the outlet 18 thereof. This is also known in the art.

In accordance with the invention, the injection channel 17 has an outlet orifice 19B for evacuating the molding material.

In the embodiments shown in FIGS. 3 to 13 in particular, like its outlet 18, the inlet orifice 19A and the outlet orifice 19B of the injection channel 17 are both controlled by the slider unit 20.

As shown here, for example, the inlet orifice 19A and the outlet orifice 19B of the injection channel 17 are disposed laterally on a section T of the injection channel 17, in contact with whose wall the slider unit 20 is slidably mounted.

In the embodiments shown in FIGS. 3 to 13 in particular, the injection valve 15 is separate from the mold 10 and in practice includes a valve body 23 containing the injection channel 17 and adapted to be attached to the mold 10, to be more precise to the bottom jaw 12' of the closure member 12 of the mold 10, having a fixing flange 24 at the bottom for this purpose.

Conjointly, in these embodiments, the injection channel 17 has the same cross section throughout its length, passing completely through the valve body 23 from the fixing flange 24 to its outlet 18. As described in more detail later, the slider unit 20, which is shown separately in FIGS. 7 to 9, has a transverse opening 25 passing completely through it and by means of which the inlet orifice 19A and the outlet orifice 19B of the injection channel 17 can communicate with each other.

In practice, in the embodiments shown in FIGS. 3 to 13, the cross section of the injection channel 17 is rectangular, with a width L1 very much less than its length L2 (see FIG. 5), and the overall shape of the slider unit 20 is that of a thin blade, whose rectangular cross section is complementary to that of the injection channel 17, and whose contour, as seen in elevation, is also rectangular.

It results from the foregoing that, in the embodiments shown in FIGS. 3 to 13, the section T of the injection channel 17 including the inlet orifice 19A and the outlet orifice 19B is not materialized in concrete form, given the uniformity of the cross section of the injection channel 17 throughout its length.

In the embodiments shown in FIGS. 3 to 13, the valve body 23 is formed of two shells 23A, 23B that meet face-to-face on a joint plane P that intersects the injection channel 17 longitudinally.

Figure 5:
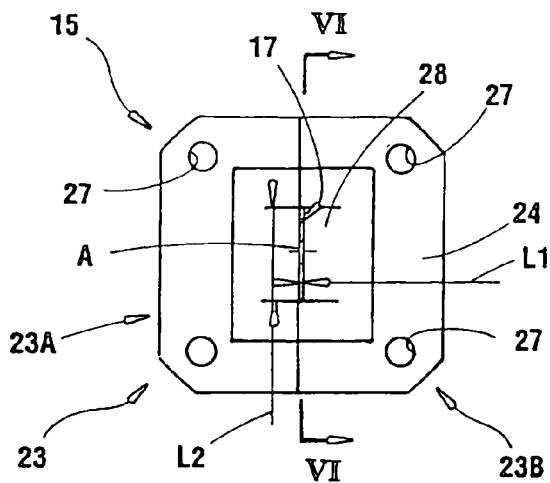
FIG. 5 is a top view of the valve body, as seen in the direction of the arrow V in FIG. 3.
Figure 6:
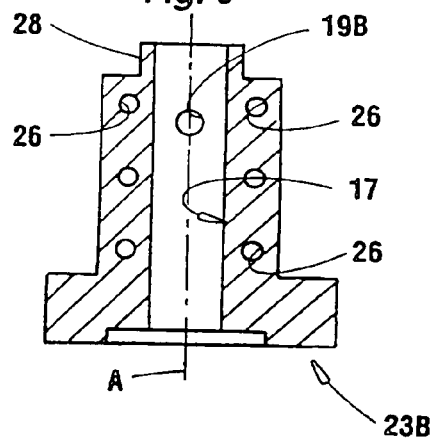
FIG. 6 is a view of one of two shells constituting the valve body in section taken along the line VI—VI in FIG. 5.
Figure 14:
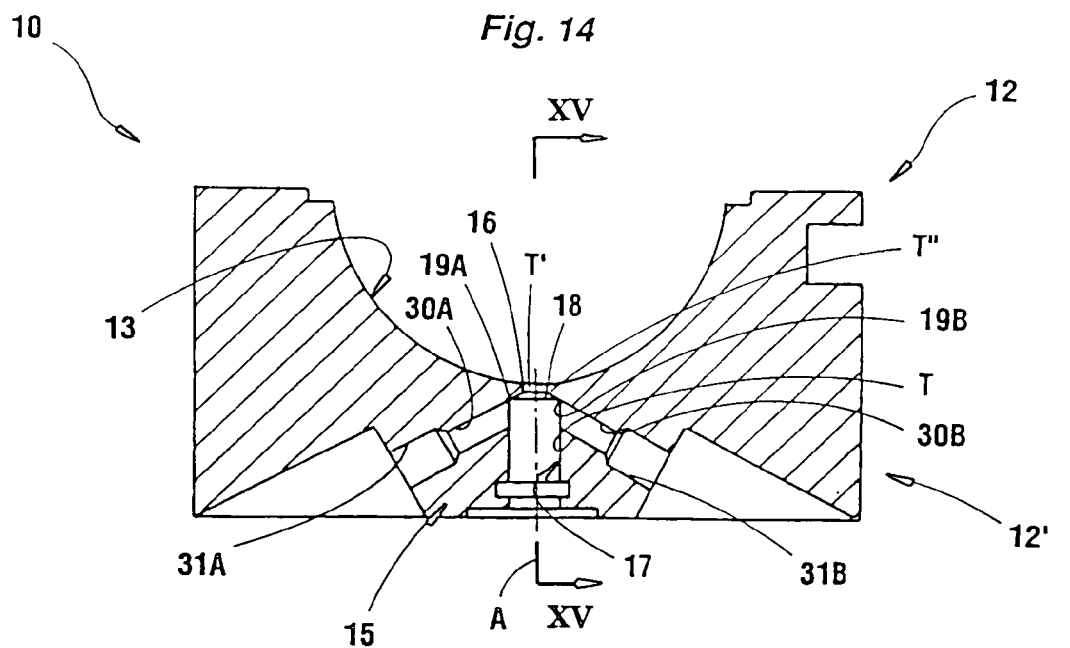
FIG. 14 is a view in longitudinal section of a further embodiment of an injection valve according to the invention.
Figure 15:
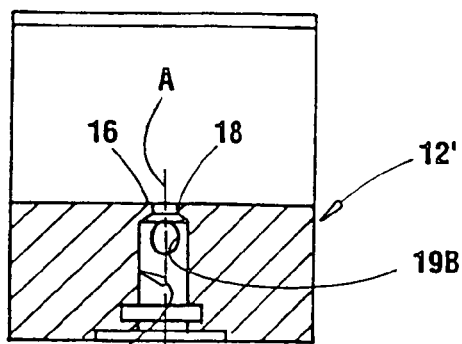
FIG. 15 is a view of this further embodiment in cross section taken along the line XV—XV in FIG. 14.
Figure 16:
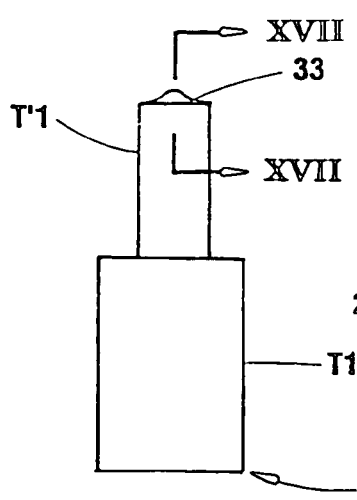
FIG. 16 is an elevation view of the corresponding slider unit to a larger scale.
Figure 17:
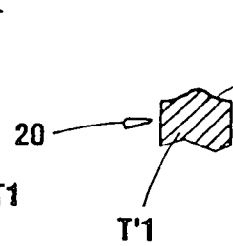
FIG. 17 is a partial view of the slider unit in longitudinal section taken along the line XVII—XVII in FIG. 16.

As is the case in these embodiments, the joint plane P is preferably the plane of one of the larger faces of the injection channel 17, and is therefore entirely part of one of the shells 23A, 23B, in this example the shell 23B, as is clear from FIGS. 5 and 6.

Thus only the shell 23B has to be machined to form the injection channel 17.

In contrast, the corresponding face of the shell 23A is advantageously smooth.

The two shells 23A, 23B constituting the valve body 23 are suitably fastened together, of course, for example by screws, not shown, which pass transversely through the injection channel 17.

To this end, and as can be seen in the case of the shell 23B in FIG. 6, each of the shells 23A, 23B has appropriate bores 26 spaced along the injection channel 17.

Similarly, the fixing flange 24 of the valve body 23, which in practice is divided half-and-half between the two shells 23A, 23B, has spaced bores 27 through which screws, not shown, are passed to fix the valve body 23 to the mold 10.

Also, in the embodiments shown in FIGS. 3 to 13, the valve body 23 has a nozzle-like external profile at the location of the outlet 18 of the injection channel 17.

In other words, it forms a more or less tapered external nose 28.

The free edge of the nose 28 is straight and substantially perpendicular to the axis A of the injection channel 17, for example (see FIG. 6).

As an alternative to this it can be concave, having the same profile as the contour of the molding cavity 13 (see FIG. 13).

In the embodiments shown in FIGS. 3 to 13, the inlet orifice 19A and the outlet orifice 19B of the injection channel 17 are offset longitudinally from each other along the axis A of the injection channel 17.

In practice, the inlet orifice 19A of the injection channel 17 is then preferably nearer its outlet 18 than the outlet orifice 19B.

However, when projected onto a common plane, and as is clear from FIGS. 10A and 10B, the inlet orifice 19A and the outlet orifice 19B of the injection channel 17 partly overlap each other.

In practice, the inlet orifice 19A and the outlet orifice 19B of the injection channel 17 are on respective opposite sides of the injection channel 17 and therefore on respective opposite sides of its axis A, one being part of the shell 23A of the valve body 23 and the other being part of the shell 23B.

In the embodiments shown in FIGS. 3 to 13, the inlet orifice 19A and the outlet orifice 19B of the injection channel 17 are both at the ends of pipes 30A, 30B at least the end parts of which are substantially perpendicular to the axis of the injection channel 17.

Figure 3:
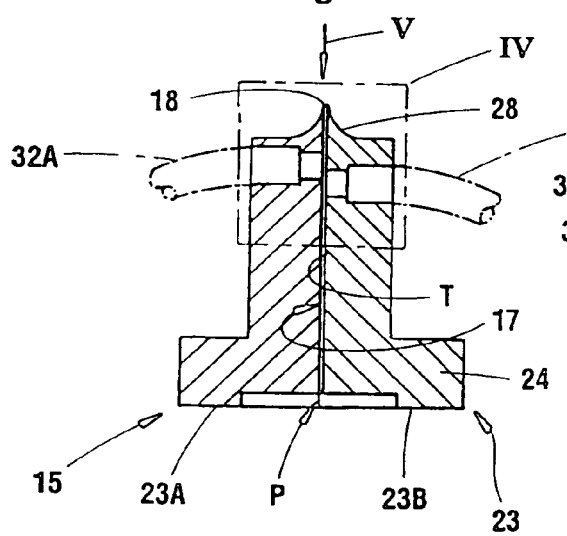
FIG. 3 is a view of the valve body of the injection valve in accordance with the invention, to a relatively larger scale and in cross section taken along the line III—III in FIG. 1.
Figure 4:
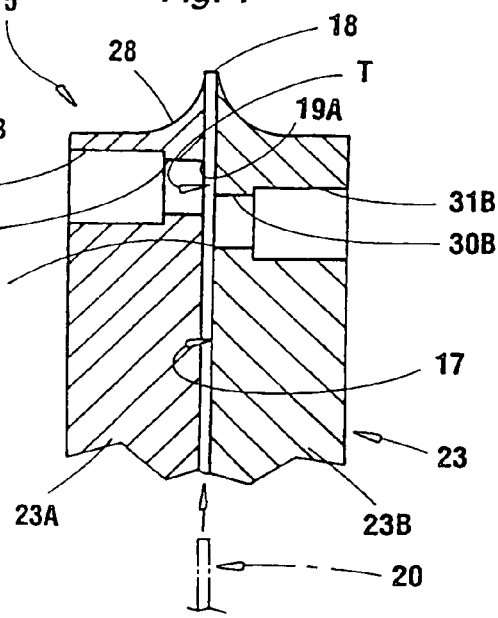
FIG. 4 shows to a relatively still larger scale the detail IV from FIG. 3.

As shown in dashed outline in FIG. 3, the pipes 30A, 30B can themselves be connected, via chambers 31A, 31B, to tubes 32A, 32B in which the molding material circulates.

In practice, the pipes 30A, 30B have circular contours and likewise therefore the inlet orifice 19A and the corresponding outlet orifice 19B.

Likewise, in practice, the inlet orifice 19A and the outlet orifice 19B both have the same diameter D.

As a corollary of this, the opening 25 in the slider unit 20 is an elongate buttonhole whose length extends along the axis A of the injection channel 17.

The width L3 of the opening 25 is at least equal to the diameter D of the inlet orifice 19A and the outlet orifice 19B, so as to enclose them.

In practice, the width L3 is substantially equal to the diameter D.

Conjointly, the length L4 of the opening 25 is much greater than the overall contour of the combination of the inlet orifice 19A and the outlet orifice 19B.

In the embodiment shown in FIGS. 3 to 9 in particular, the shells 23A, 23B constituting the valve body 23 are relatively massive, and are made of metal, for example.

Conjointly, the slider unit 20 is itself made of metal, preferably stainless steel.

Also, in this embodiment, the free end 33 of the slider unit 20 is straight, like the free edge of the nose 28 of the valve body 23.

In service, the slider unit 20 is mobile between an advanced position, in which, as shown in FIG. 10A, its free end 33 is level with the outlet 18 of the injection channel 17, and a retracted position, in which, as shown in continuous outline in FIG. 10B, it partly uncovers the inlet orifice 19A but covers the outlet orifice 19B.

In the advanced position, the opening 25 in the slider unit 20 establishes communication between the inlet orifice 19A and the outlet orifice 19B but completely blocks the injection channel 17.

The molding material therefore circulates continuously through the injection valve 15, without feeding the molding cavity 13 of the mold 10.

In contrast, in the retracted position of the slider unit 20 the molding cavity 13 of the mold 10 is fed with the molding material, which is not diverted to the outlet orifice 19B.

In all intermediate positions of the slider unit 20, as long as its free end 33 has at least reached, and passed beyond, the inlet orifice 19A, as shown in dashed outline in FIG. 10B, the molding cavity 13 of the mold 10 is advantageously fed, at a more or less variable flow rate.

Obviously, the fact that, when projected onto a plane, the inlet orifice 19A and the outlet orifice 19B of the injection channel 17 overlap has the advantage that this limits the stroke of the slider unit 20.

To limit this stroke further, and optimally, the inlet orifice 19A is preferably as close as possible to the outlet 18 of the injection channel 17.

As will also be noted, the molding material is in contact with the walls of the injection channel 17 only when the slider unit 20 is in the retracted position, and its contact with those walls is then limited to just the end portion of the injection channel 17.

This advantageously minimizes the risk of fouling of the injection channel 17, especially as, on each outward and return movement, the slider unit 20 sweeps the walls of the injection channel 17 completely.

As a corollary of this, the risks of "bubbling" of the molding material are themselves minimized.

In the embodiment shown in FIGS. 11 to 13, the shells 23A, 23B constituting the valve body 23 are thinner than previously, ignoring the fixing clamp 24.

They are made from a synthetic material, for example, preferably a fluoropolymer-based synthetic material such as PTFE, for example.

As shown in dashed outline in FIG. 11, the shells 23A, 23B can then each be reinforced laterally by a metal plate 34A, 34B, if required.

As a corollary of this, the slider unit 20, not shown, is preferably still made of metal.

Also, in this embodiment, at least one of the pipes 30A, 30B with the inlet orifice 19A and the outlet orifice 19B at their ends is connected to the orifice by an enlargement 36A, 36B that is elongate in the direction of the outlet 18 of the injection channel 17.

As shown here, for example, the enlargement 36A, 36B is produced by a bevel 37A, 37B which intersects the pipe 30A, 30B concerned obliquely.

In the embodiment shown, there is an enlargement 36A, 36B for each of the pipes 30A, 30B, and the enlargement 36A, 36B extends as far as the immediate vicinity of the outlet 18 of the injection channel 17.

In practice, in the embodiment shown, the angle between the bevel 37A, 37B of the enlargement 36A, 36B of a pipe 30A, 30B and the axis A of the injection channel 17 is different for the two pipes 30A, 30B.

For example, it is greater for the pipe 30A corresponding to the inlet orifice 19A than for the pipe 30B corresponding to the outlet orifice 19B.

Otherwise, the features are of the same kind as previously.

In the embodiment shown in FIGS. 14 to 17, the injection valve 15 according to the invention is an integral part of the mold 10.

In other words, it is incorporated into the mold 10.

To be more precise, in the embodiment shown, it is incorporated into the bottom jaw 12' of the closure member 12 of the mold 10, and is in one piece with the remainder of the bottom jaw 12'.

Also, in this embodiment, the injection channel 17 has, successively, starting from its outlet 18, which is coincident with the casting opening 16 of the mold 10, at least two sections T', T, namely a smaller first section T', at the end of which is the outlet 18, and a larger second section T, which incorporates the inlet orifice 19A and the outlet orifice 19B, and, conjointly, the slider unit 20 has two sections T'1, T1 whose dimensions are complementary to those of the sections T', T of the injection channel 17.

As shown here, for example, the two sections T', T of the injection channel 17 are both cylindrical and are connected by a frustoconical transition section T".

In practice, the inlet orifice 19A and the outlet orifice 19B of the injection channel 17 are in diametrally opposed positions relative to each other, on respective opposite sides of the axis A of the injection channel 17.

In the embodiment shown, the inlet orifice 19A and the outlet orifice 19B are at the ends of pipes 30A, 30B at least end parts of which are oblique to the axis A of the injection channel 17, at an acute angle thereto.

As shown here, for example, this angle is the same for both pipes 30A, 30B.

In the embodiment shown, the profile of the free end 33 of the slider unit 20 is globally concave from its central part to its periphery.

In the advanced position of the slider unit 20, its section T'1 is interengaged with the section T' of the injection channel 17, which prevents feeding of the molding cavity 13, and, conjointly, its section T1 is interengaged with the section T of the injection channel 17.

However, because of the length of the section T'1 of the slider unit 20, on the one hand, and because of the difference between the diameters of the section T'1 and the section T1 from which it follows on, on the other hand, the molding material still circulates continuously through the injection valve 15, bypassing the section T'1.

This circulation of the molding material through the injection valve 15 continues in the retracted position of the slider unit 20, but the molding cavity 13 is fed because of the proximity of the corresponding flow to the outlet 18 of the injection channel 17, which is uncovered at this time, and because of the oblique nature of the passage 30A through which the molding material is discharged into the injection channel 17.

Figure 18:
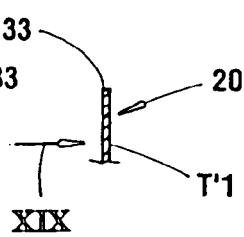
FIG. 18 is a partial view of a still further embodiment in longitudinal section and analogous to FIG. 17.
Figure 19:
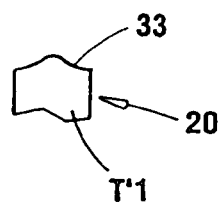
FIG. 19 is a partial elevation view of this still further embodiment as seen in the direction of the arrow XIX in FIG. 18.

In the embodiment shown diagrammatically in FIGS. 18 and 19, instead of being cylindrical, the end section T'1 of the slider unit 20 is in the form of a blade, as in the embodiments shown in FIGS. 3 to 13.

However, as shown here, its free end 33 can be profiled, as previously.

It is found that a profiled free end 33 on the slider unit 20 minimizes the risks of "bubbling" of the molding material in the molding cavity 13 at the location of the injection channel 17.

Of course, the present invention is not limited to the embodiments described and shown, but encompasses any variant execution and/or combination of the components thereof.

What is claimed is:

1. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof, characterized in that the injection channel (17) has an outlet orifice (19B) for evacuating molding material and in that the slider unit (20) is arranged to be able, in a certain position, to prevent the injection of material through the outlet (18) while allowing the circulation of material inside the injection channel (17), between the inlet and outlet orifices (19A, 19B),
  characterized in that the inlet orifice (19A) and the outlet orifice (19B) of the injection channel (17) are offset longitudinally from each other.

2. An injection valve according to claim 1, characterized in that, like its outlet (18), the inlet orifice (19A) and the outlet orifice (19B) of the injection channel (17) are both controlled by the slider unit (20).

3. An injection valve according to claim 2, characterized in that the inlet orifice (19A) and the outlet orifice (19B) of the injection channel (17) are laterally disposed on a section (T) of said injection channel (17) in contact with the wall of which the slider unit (20) is slidably mounted.

4. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof,
  characterized in that,
  the injection channel (17) has an outlet orifice (19B) for evacuating molding material,
  the inlet orifice (19A) and the outlet orifice (19B) of the injection channel (17) are offset longitudinally from each other, and
  the inlet orifice (19A) of the injection channel (17) is closer to its outlet (18) than the outlet orifice (19B).

5. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof,
  characterized in that,
  the injection channel (17) has an outlet orifice (19B) for evacuating molding material,
  the inlet orifice (19A) and the outlet orifice (19B) of the injection channel (17) are offset longitudinally from each other, and
  projected onto a common plane, the inlet orifice (19A) and the outlet orifice (19B) of the injection channel (17) partly overlap.

6. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof, characterized in that the injection channel (17) has an outlet orifice (19B) for evacuating molding material and in that the slider unit (20) is arranged to be able, in a certain position, to prevent the injection of material through the outlet (18) while allowing the circulation of material inside the injection channel (17), between the inlet and outlet orifices (19A, 19B), characterized in that the inlet orifice (19A) and the outlet orifice (19B) of the injection channel (17) are at the ends of pipes (30A, 30B) at least end parts of which are substantially perpendicular to the axis (A) of the injection channel (17).

7. An injection valve according to claim 1, characterized in that the inlet orifice (19A) and the outlet orifice (19B) of the injection channel (17) are at the ends of pipes (30A, 30B) at least end parts of which are oblique to the axis (A) of the injection channel (17).

8. An injection valve according to claim 6, characterized in that at least one of the pipes (30A, 30B) with the inlet orifice (19A) and the outlet orifice (19B) at their ends is connected to the respective orifice by an enlargement (36A, 36B) that is elongate in the direction of the outlet (18) of the injection channel (17).

9. An injection valve according to claim 8, characterized in that the enlargement (36A, 36B) of a pipe (30A, 30B) is produced by a bevel (37A, 37B) that intersects the pipe (30A, 30B) obliquely.

10. An injection valve according to claim 9, characterized in that an enlargement (36A, 36B) is provided on each of the pipes (30A, 30B).

11. An injection valve according to claim 10, characterized in that the angle between the bevel (37A, 37B) of the enlargement (36A, 36B) of a pipe (30A, 30B) and the axis (A) of the injection channel (17) is different from one of the pipes (30A, 30B) to the other.

12. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof, characterized in that the injection channel (17) has an outlet orifice (19B) for evacuating molding material and in that the slider unit (20) is arranged to be able, in a certain position, to prevent the injection of material through the outlet (18) while allowing the circulation of material inside the injection channel (17), between the inlet and outlet orifices (19A, 19B), characterized in that the profile of the free end (33) of the slider unit (20) is globally concave from its central part to its periphery.

13. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof, characterized in that the injection channel (17) has an outlet orifice (19B) for evacuating molding material and in that the slider unit (20) is arranged to be able, in a certain position, to prevent the injection of material through the outlet (18) while allowing the circulation of material inside the injection channel (17), between the inlet and outlet orifices (19A, 19B), characterized in that the injection channel (17) has the same cross section over the whole of its length and the slider unit (20) has a transverse opening (25) that passes completely through it and through which the inlet orifice (19A) and the outlet orifice (19B) of the injection channel (17) can communicate with each other.

14. An injection valve according to claim 13, characterized in that the cross section of the injection channel (17) is rectangular, with a width (L1) very much less than its length (L2), and the slider unit (20) has the overall form of a thin blade.

15. An injection valve for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof, characterized in that the injection channel (17) has an outlet orifice (19B) for evacuating molding material and in that the slider unit (20) is arranged to be able, in a certain position, to prevent the injection of material through the outlet (18) while allowing the circulation of material inside the injection channel (17), between the inlet and outlet orifices (19A, 19B), characterized in that the injection channel (17) has at least two sections (T', T), namely a smaller first section (T') at the end of which is the outlet (18) and a larger second section (T) including the inlet orifice (19A) and the outlet orifice (19B), and the slider unit (20) has two sections (T'1, T1) whose dimensions are complementary to those of the sections (T', T) of the injection channel (17).

16. An injection valve according to claim 15, characterized in that the two sections (T', T) of the injection channel (17) are both cylindrical.

17. An injection valve according to claim 16, characterized in that the two sections (T', T) of the injection channel (17) are connected to each other by a frustoconical transition section (T").

18. An injection valve according for feeding molding material to a mold, of the kind including an injection channel (17) which opens to the outside via an outlet (18) and which has, at a distance from said outlet (18), an inlet orifice (19A) to which the molding material is fed, and further including a slider unit (20) that is mounted in the injection channel (17) to be mobile in translation therein, and that controls the outlet (18) thereof, characterized in that the injection channel (17) has an outlet orifice (19B) for evacuating molding material and in that the slider unit (20) is arranged to be able, in a certain position, to prevent the injection of material through the outlet (18) while allowing the circulation of material inside the injection channel (17), between the inlet and outlet orifices (19A, 19B), and including a valve body (23) which contains its injection channel (17) and is adapted to be attached to a mold (10), characterized in that the valve body (23) is formed of two shells (23A, 23B) meeting face-to-face in a joint plane (P) that intersects the injection channel (17) longitudinally.

19. An injection valve according to claim 18, characterized in that the joint plane (P) is the plane of one of the larger faces of the injection channel (17) and thus belongs completely to one of the shells (23B).

20. An injection valve according to claim 18, characterized in that the valve body (23) has a nozzle-like external profile at the location of the outlet (18) of the injection channel (17).

21. An injection valve according to claim 18, characterized in that the shells (23A, 23B) are made of synthetic material.

22. An injection valve according to claim 21, characterized in that the shells (23A, 23B) are made of a fluoropolymer-based synthetic material.

23. An injection valve according to claim 22, wherein the shells (23A, 23B) are made of PTFE.

24. An injection valve according to claim 1, characterized in that it is an integral part of a mold (10).

25. An injection valve according to claim 1, characterized in that the slider unit (20) is made of metal.

* * * * *